US005680917A

United States Patent [19]
Bray

[11] Patent Number: 5,680,917
[45] Date of Patent: Oct. 28, 1997

[54] CLUTCH OR BRAKE ENGAGEMENT PRESSURE COMPENSATION

[75] Inventor: Steven C. Bray, Washington, Ill.

[73] Assignee: Caterpillar Inc., Peoria, Ill.

[21] Appl. No.: 534,777

[22] Filed: Sep. 27, 1995

[51] Int. Cl.$^6$ .................................... F16D 43/20
[52] U.S. Cl. .................... 192/54.3; 192/85 R; 477/180
[58] Field of Search ............................ 192/54.3, 85 R; 477/174, 180

[56] References Cited

U.S. PATENT DOCUMENTS

| | | | |
|---|---|---|---|
| 4,577,737 | 3/1986 | Niikura et al. | 477/174 X |
| 4,699,239 | 10/1987 | Ishino et al. | 180/315 |
| 4,702,358 | 10/1987 | Mueller et al. | 192/13 |
| 4,711,333 | 12/1987 | Okamura | 477/174 X |
| 4,720,003 | 1/1988 | Murasugi | 477/174 X |
| 4,781,265 | 11/1988 | Weiler et al. | 192/54.3 X |
| 4,881,627 | 11/1989 | Ishii | 477/174 X |
| 4,969,545 | 11/1990 | Hayashi | 477/174 X |
| 5,002,170 | 3/1991 | Parsons et al. | 477/174 X |
| 5,092,435 | 3/1992 | Sone et al. | 477/174 X |
| 5,325,933 | 7/1994 | Matsushita | 180/6.7 |

*Primary Examiner*—Andrea L. Pitts
*Attorney, Agent, or Firm*—Mario J. Donato, Jr.

[57] ABSTRACT

An apparatus for controlling a clutch or brake in an application with variable torque requirements. Control logic momentarily sets the control signal to an initial level to allow adequate time to engage the clutch or brake, and then changes the control signal at an acceptable rate until reaching the required torque level. The initial level is varied based upon the required torque, such that at low levels of required torque, a signal with low initial torque (although possibly higher than the required torque), is used to achieve smoother engagement at some sacrifice in response, and at higher levels of required torque, a signal with higher initial torque is used to improve response.

3 Claims, 9 Drawing Sheets

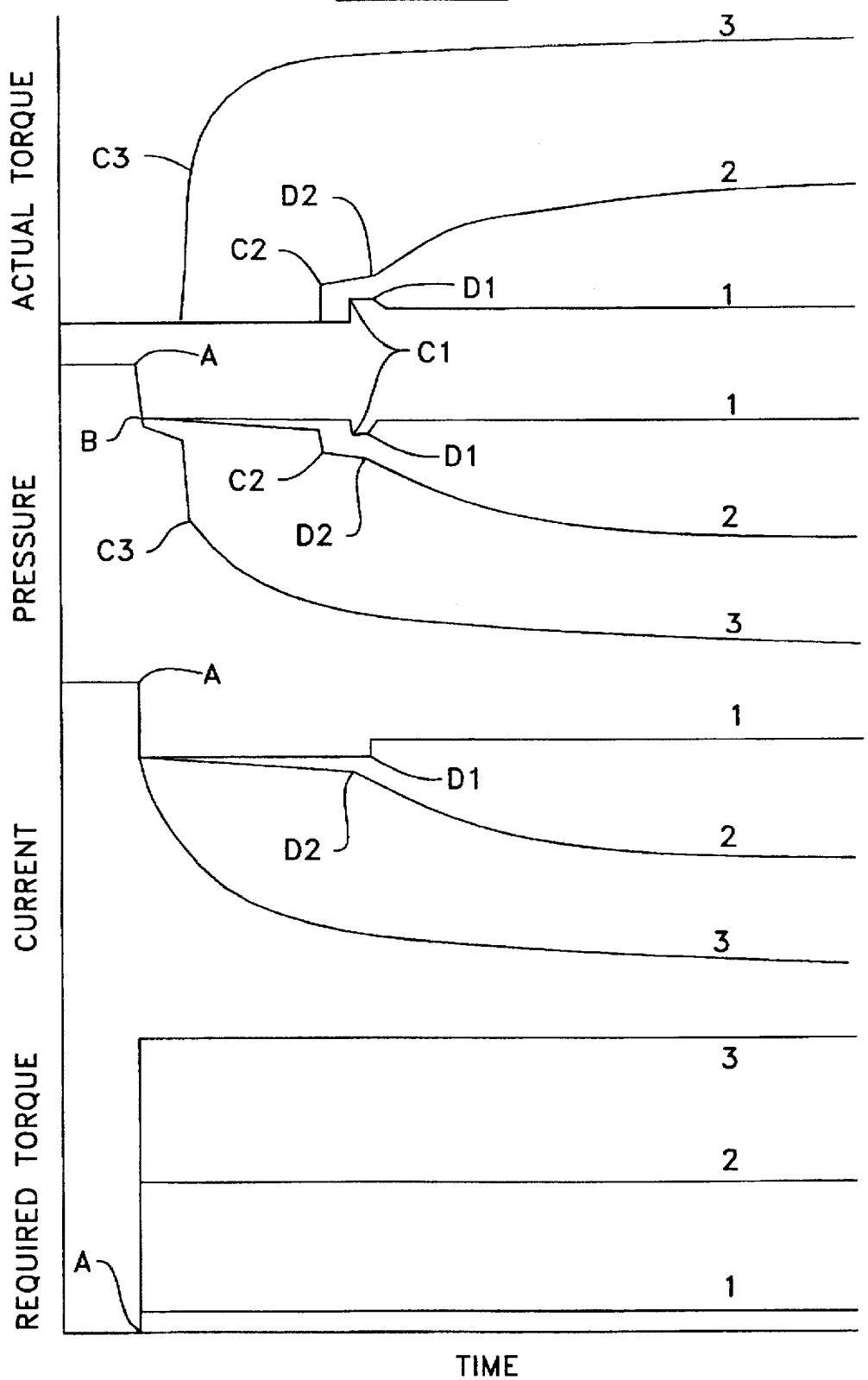
Fig_3

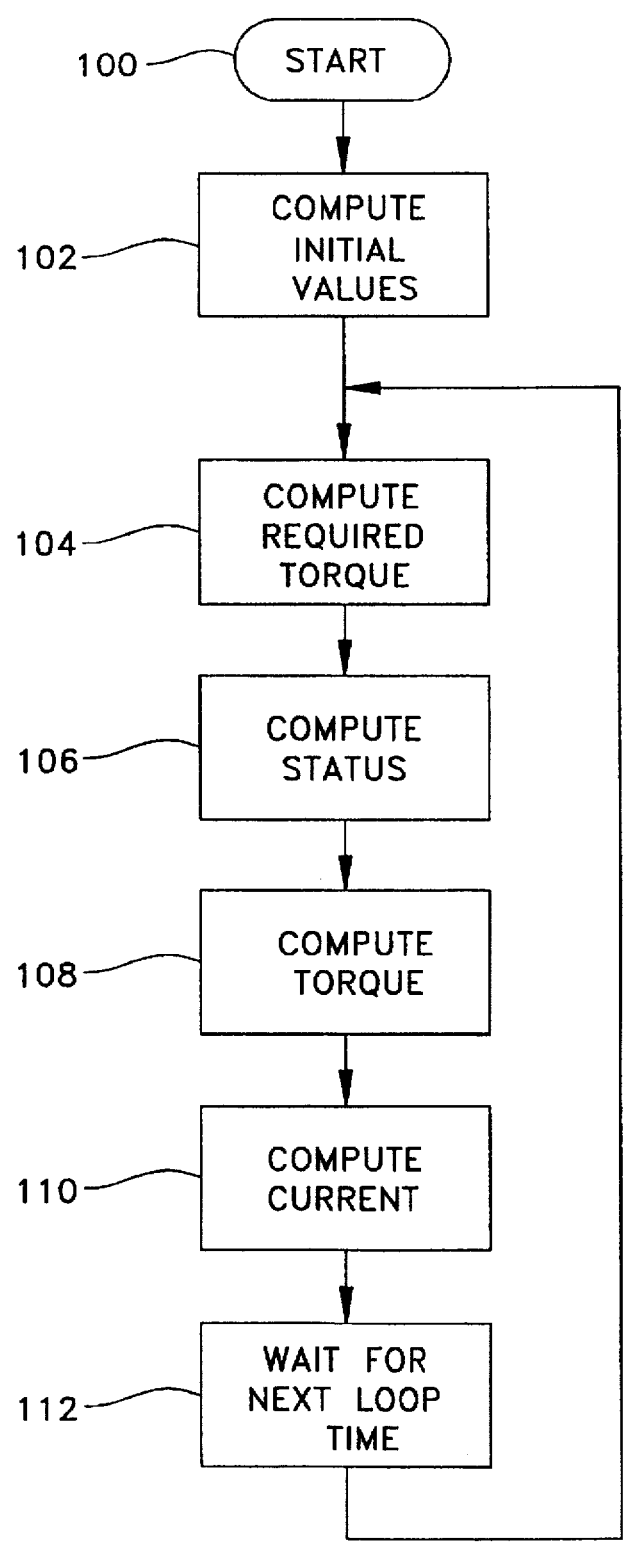
Fig_4_

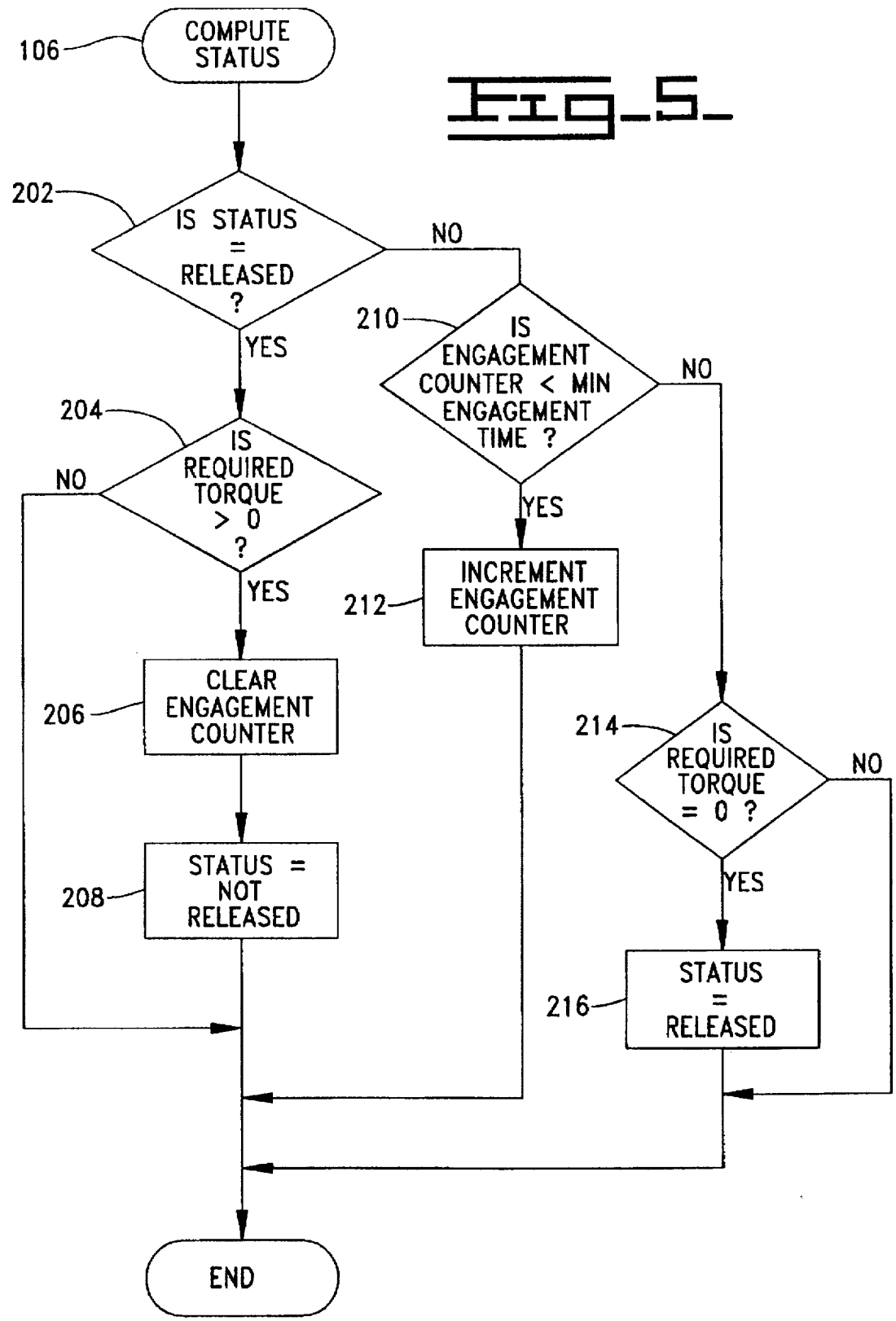
Fig_5_

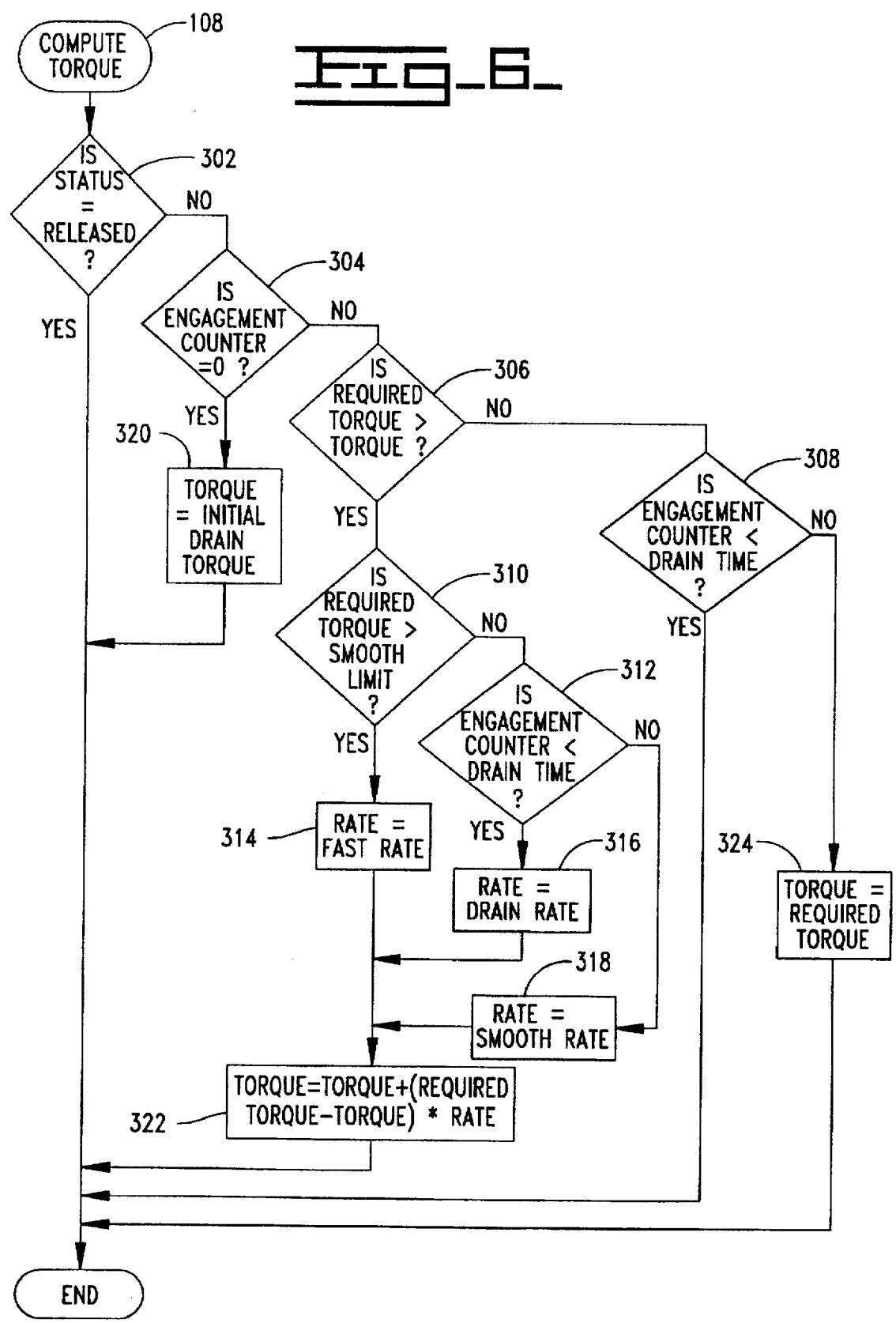
Fig_6_

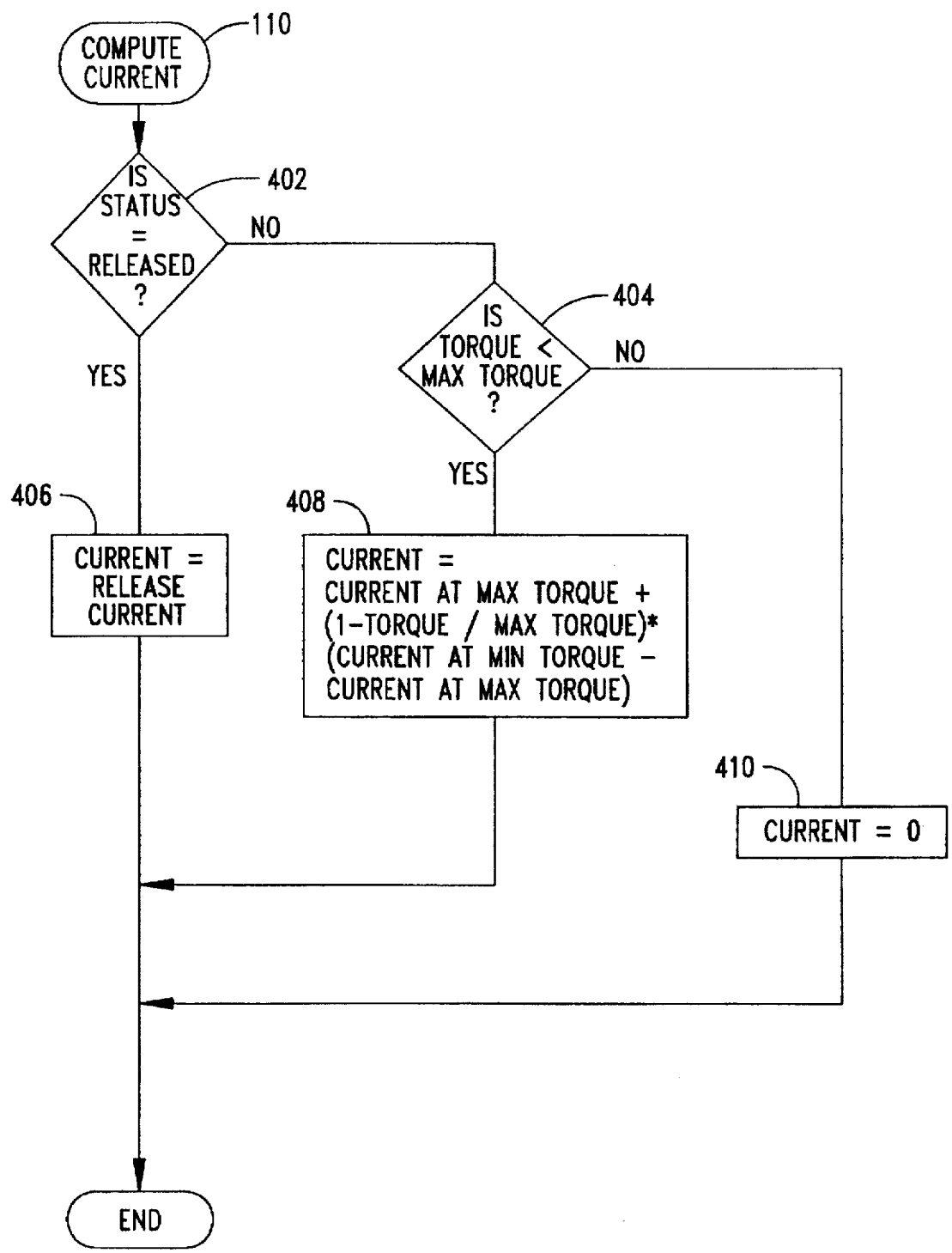
Fig-7-

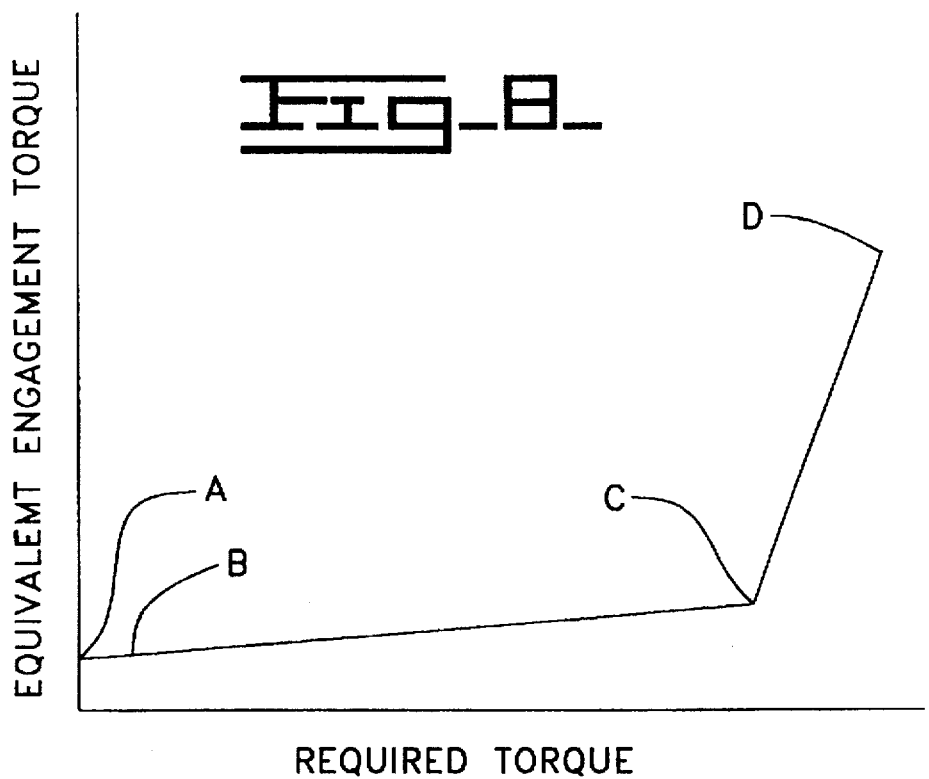
Fig_8_
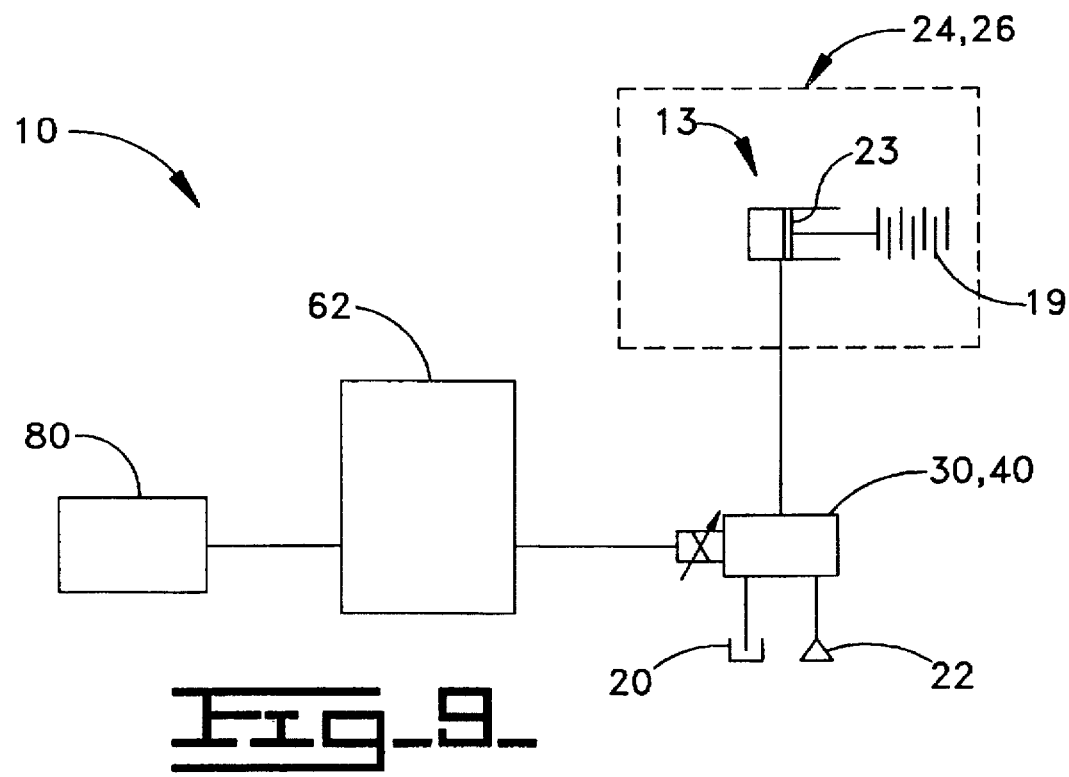
Fig_9_

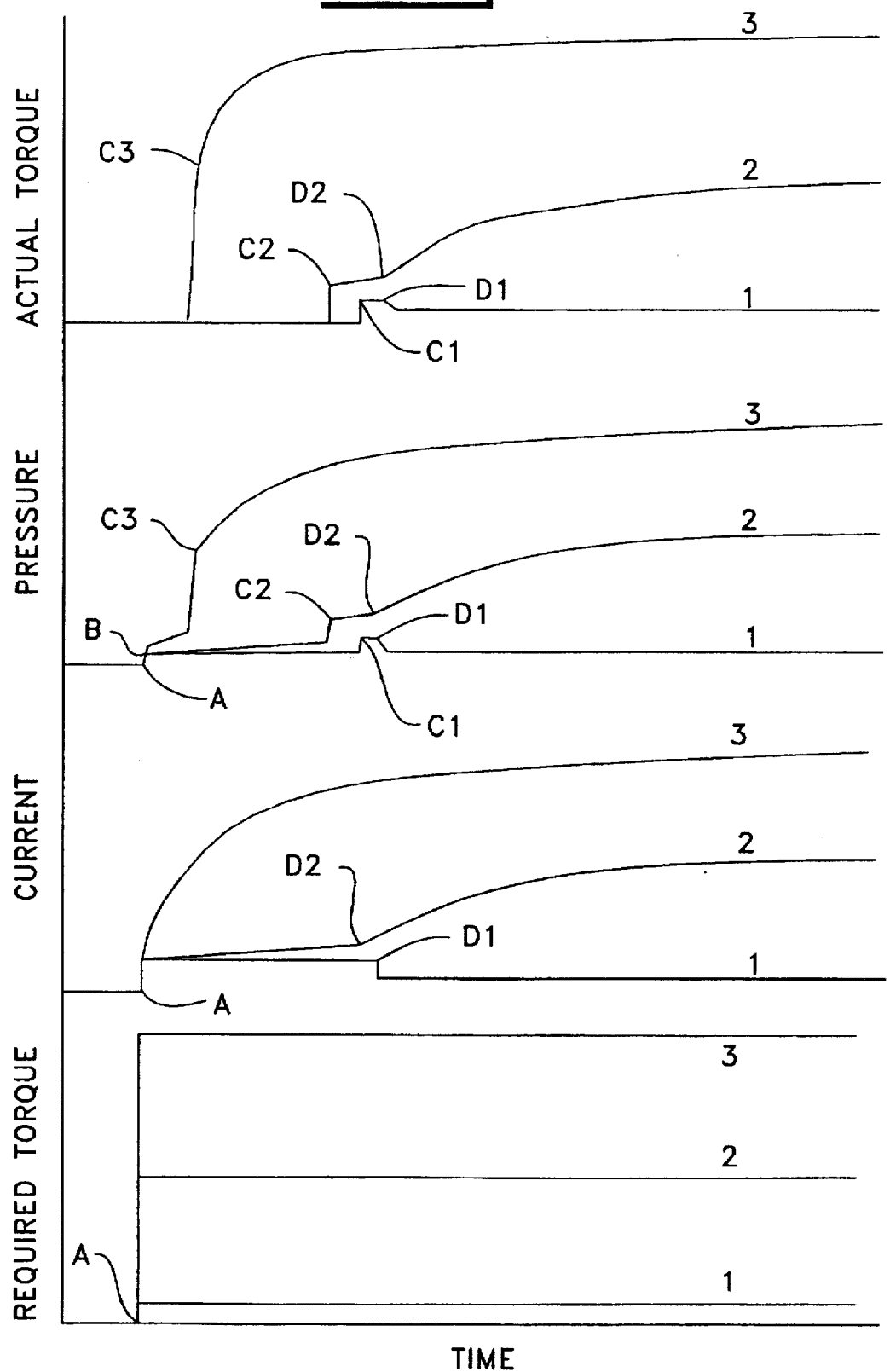

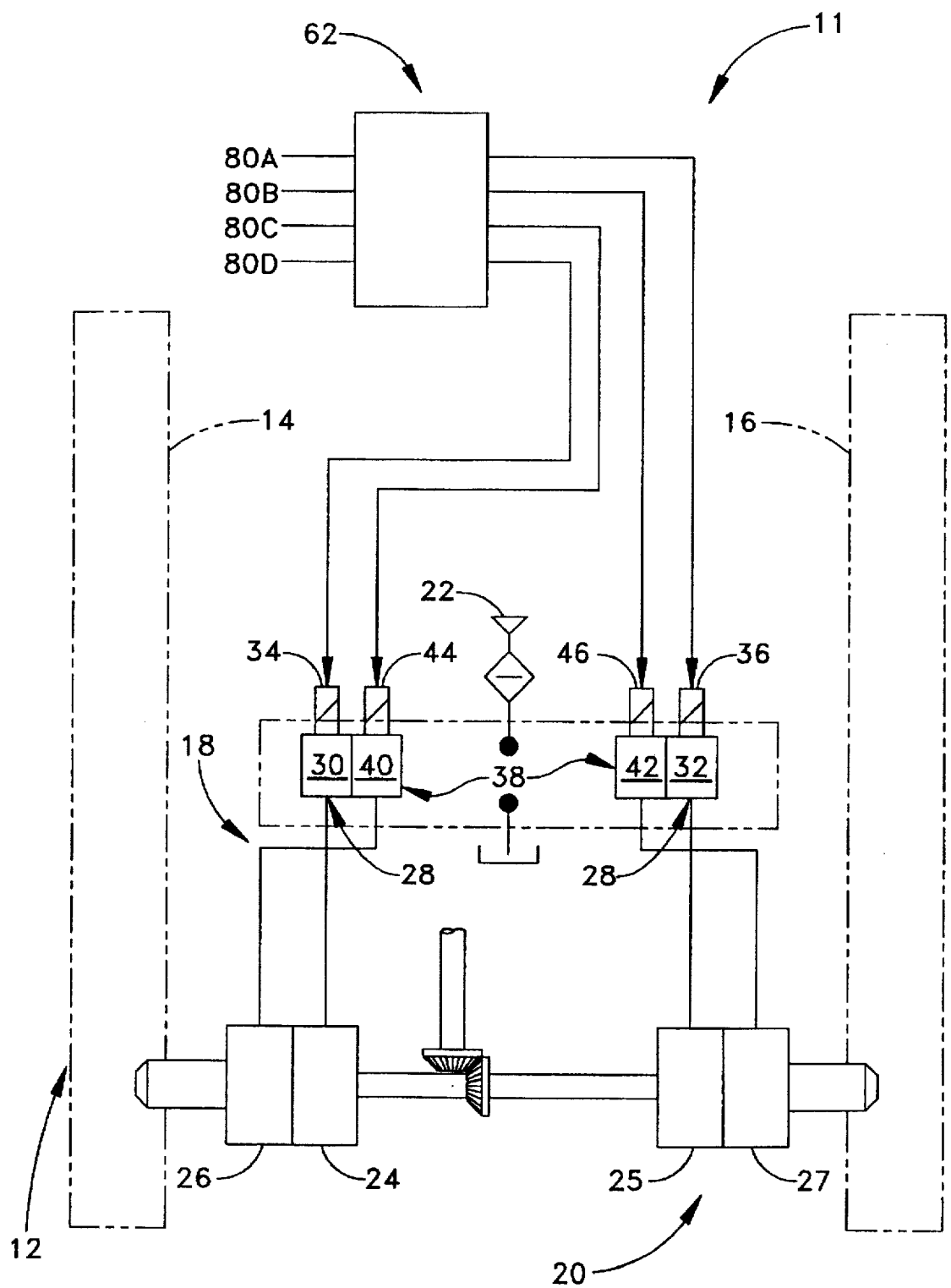
Fig_11_

5,680,917

CLUTCH OR BRAKE ENGAGEMENT PRESSURE COMPENSATION

TECHNICAL FIELD

This invention relates generally to clutch or brake engagement pressure compensation, and more particularly an apparatus for controlling a clutch or brake in an application with variable torque requirements.

BACKGROUND ART

It is well known in the prior art that hydraulic pressure acting on a piston can control the degree of clutch or brake torque. The disengaged minimum torque condition requires some running clearance. The transition between this disengaged state and the engaged state requires time for fluid to either flow to or flow from the control piston. There is very low torque until the control piston has moved to take up the clearance and exert force on the clutch or brake. The control of the fluid pressure and flow during this engagement process affects the engagement delay and the initial torque. Thus, there exists a tradeoff between response and smoothness. In applications that require engagement to varying levels of torque, the optimum tradeoff between delay and initial torque is in general dependent upon the required level of torque at that time.

Much prior art exists pertaining to engagement of clutches and brakes. In a few applications, the engagement delay requires no special attention, but in most applications special control techniques for engagement are utilized. Hydro mechanical control valves for engaging transmission clutches often have a fixed fill pressure or flow rate until end of fill and then pressure is increased. The end of fill is detected by a slight rise in pressure. In this way, the control valves automatically adjust to the fill time. More recently, hydro mechanical control valves are being replaced with electrohydraulic control valves. As a result, much work has been done to detect the end of fill by using a variety of techniques such as pressure sensors, valve position sensors, solenoid signal changes, speed measurements, and torque measurements. Furthermore, prior art exists for shifting automatic transmissions in the automotive industry. In such an application, typically the pressure modulation during shifting is often modified by some feedback of the load. It should be noted that detection of end of fill is beyond the scope of the present invention and it is assumed that any of the foregoing refinements can be used with the present invention.

There are various reasons for waiting to start ramping the pressure upward until the piston is filled. One of the principal of those reasons is that if the pressure is ramped upward and set to a level which is too high before the piston is filled, then once the piston becomes filled, the pressure will come in at a high value and the shift or the brake will be a very harsh one. The present invention is examining the transients while the clutch or brake is being engaged and a dwell time allows the piston controlling the degree of clutch or brake torque to fill and "touch up" and the modulation time ramps the pressure to make the shift or brake smooth.

Much of the prior art pertains to hydraulically engaged clutches and brakes in which the piston is filled at low pressure for engagement. One embodiment of the present invention pertains to spring applied clutches and brakes with an opposing hydraulic control piston. In this embodiment of the present invention, fluid is drained for engagement and pressure must be controlled at a precise level such that the pressure exerts a force slightly less than the spring force. The present invention holds the pressure level at a reasonable level so that the piston either fills or drains, depending on the implementation, thereby allowing the clutch or brake to engage before ramping the pressure up or down.

The present invention is directed to overcoming one or more of the problems as set forth above.

DISCLOSURE OF THE INVENTION

In accordance with one aspect of the present invention, there is provided a spring applied hydraulically released clutch or brake, including a means for determining a required torque, a computer based controlling unit for carrying out the control technique of the present invention, and an electrohydraulic valve, and a clutch or brake. In such a system, there is a delay applying the clutch or brake as hydraulic fluid flows from the piston that is controlling the degree of clutch or brake torque. At high pressures, the spring is compressed and there is no clutch or brake torque. When the pressure is very slightly less than balancing the spring force, there is slight brake torque and a comparatively long engagement time because there is very little pressure difference to cause flow. At lower pressure, the delay time is less but the torque is higher. Smooth engagement of a clutch or brake requires low initial torque, but quick response requires short delay times.

Therefore, the present invention pertains to applications of clutches and brakes in which the required engagement torque varies and there is not a constant drain pressure with acceptable response and smoothness for all conditions. Oftentimes, more delay is acceptable when engaging to a low torque and more initial torque is acceptable when engaging to a high torque. The response and smoothness can be improved by varying the drain pressure based on the required torque.

BRIEF DESCRIPTION OF THE DRAWINGS

FIG. 3 illustrates a graphical representation of the control technique as applied to the system shown in FIG. 1;

FIG. 4 is a high level flow chart illustrating control logic to implement the present invention;

FIG. 5 is a flow chart illustrating control logic to compute the status of the clutch or brake;

FIG. 6 is a flow chart illustrating control logic to compute the internal torque parameter;

FIG. 7 is a flow chart illustrating control logic to compute the control current based on the internal torque parameter and the release status;

FIG. 8 is a graphical representation of an alternate implementation of the present invention;

FIG. 9 is a block diagram of an alternate embodiment of the present invention illustrating control of a hydraulically applied clutch or brake;

FIG. 10 is a graphical representation illustrating the control technique of the alternate embodiment of the present invention shown in FIG. 9;

FIG. 11 illustrates a block diagram showing the application of the present invention to the steering and braking of a track type vehicle.

BEST MODE FOR CARRYING OUT THE INVENTION

Figure 1:
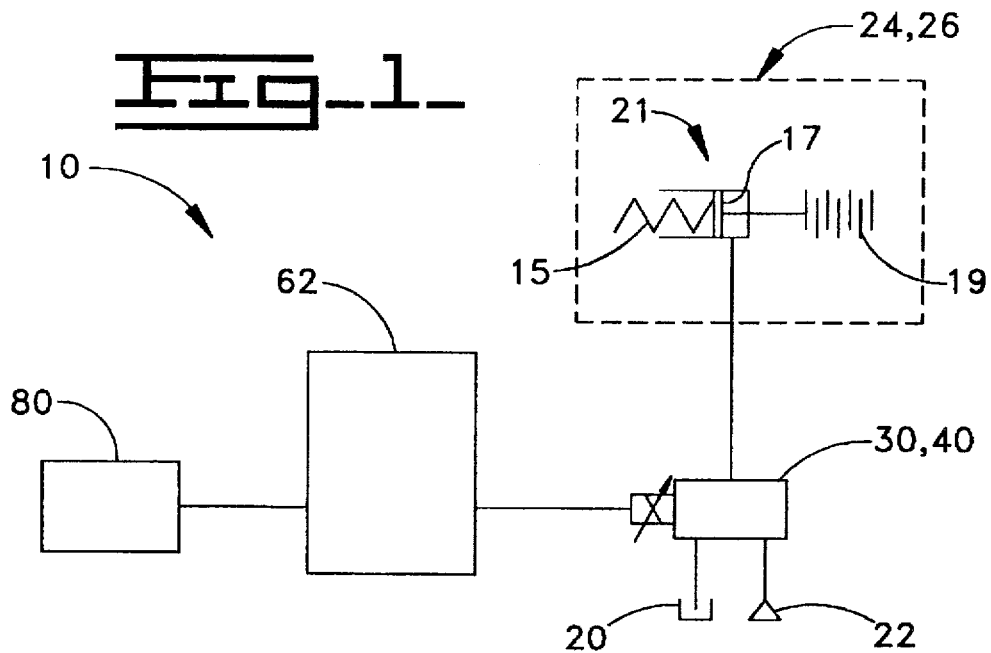
FIG. 1 illustrates a block diagram of an embodiment of the present invention illustrating control of a spring applied, hydraulically released clutch or brake.

Referring now to the drawings, wherein a preferred embodiment of the present apparatus 10 is shown, FIG. 1 illustrates a block diagram of one embodiment of the present invention illustrating control of a spring applied, hydraulically released clutch or brake. Referring to FIG. 1, 80 is a source of a multi-level signal that can be the basis for determining a required torque level. It is assumed that this torque level varies in time. Source 80 may sense operator input, machine status, or remote control signals. The required torque may be proportional to a single signal or a complex computation based upon multiple signals with multiple computer based control units. A computer based control unit 62 receives the signal from the source 80, implements the control technique of the present invention and provides a control signal compatible with valve 30,40. Valve 30,40 is preferably an electrohydraulic valve that regulates a control pressure roughly proportional to an electronic control signal. Valve 30,40 has adequate response, pressure range and flow capacity for controlling the clutch or brake assembly 24,26. Piston assembly 21 comprises spring 15 which provides the force to engage the brake or clutch 19, which is opposed by the control pressure acting on the piston 17.

When the pressure acting on the piston 17 causes a force very slightly less than the spring force, the net excess spring force acts on the clutch or brake 19 causing a very low torque. This point of minimal torque will be referred to as "touch up" with a corresponding "touch up" pressure and control signal level. As pressure is decreased, the torque will increase until the pressure is zero and full spring force is exerted on the clutch or brake 19. At pressures higher than "touch up", the piston 17 will move away from the brake or clutch 19, resulting in minimum torque.

Clutches and brakes require some running clearance to reduce drag and heat generation to acceptable levels when disengaged. This clearance can also increase with time due to wear. The control piston must move this distance during engagement and disengagement. The stroke and piston area defines a displaced fluid volume. Fluid flow rate is determined by the difference between the pressure exerted by the spring force and the pressure controlled by the valve. The displaced volume and flow rate defines the drain time and engagement delay.

Figure 2:
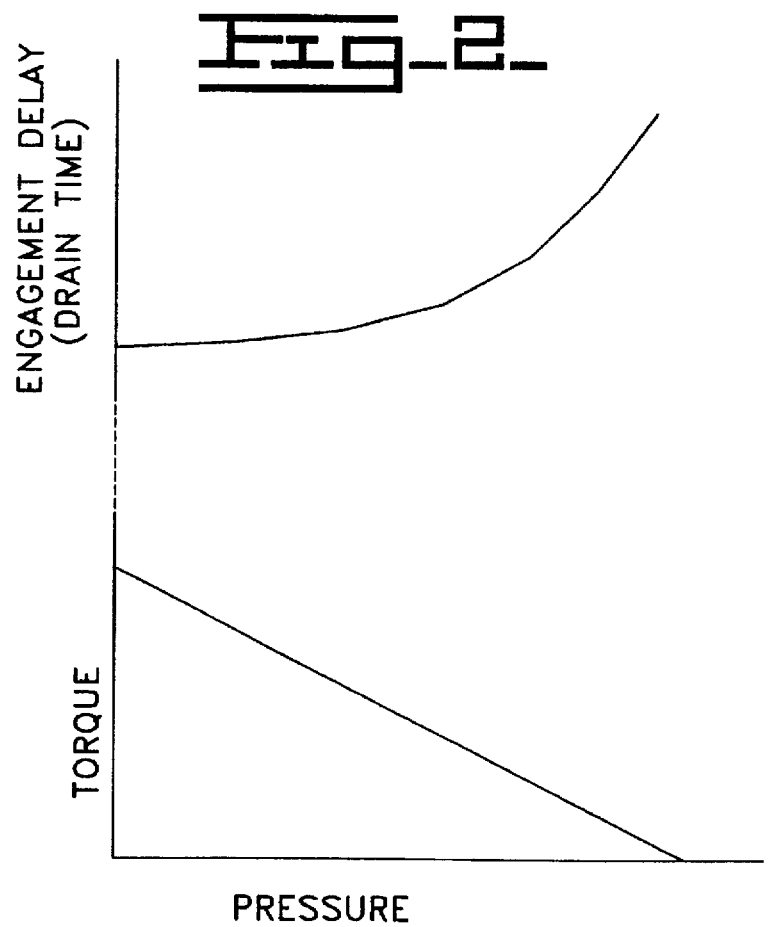
FIG. 2 illustrates a graphical representation of the effect of initial pressure on the engagement delay and initial torque.

As mentioned above, the relationship of initial torque and engagement delay to the initial level of control pressure is extremely important. Referring to FIG. 2, when the pressure is above the touch up pressure, there is no torque. At the touch up pressure, there is minimal torque and essentially infinite delay. At a pressure lower than the touch up pressure, there is less delay but more initial torque. Finally, at zero pressure, there is minimum delay but maximum initial torque. Oftentimes, more delay is acceptable when engaging to a low torque and more initial torque is acceptable when engaging to a high torque. The response and smoothness can be improved by varying the drain pressure based on the required torque.

FIG. 3 illustrates a graphical representation of the control technique as applied to the system shown in FIG. 1. As seen in FIG. 3, four dependent parameters are plotted versus time for three different cases. Required Torque is a time varying input signal for this control technique, wherein the required torque defines the current target torque level. However, transient deviation is required for smooth and responsive transitions. The Current Curves are the resulting control signals from the computer based control unit 62 (FIG. 1) for the three cases. The Pressure Curves are the resulting pressure signals from valve 30,40 (FIG. 1). The Actual Torque curves are the resulting torque from clutch or brake 19 (FIG. 1). The curves labeled 1, 2, and 3 on each of the four dependent parameter curves illustrate three different cases, where the required torque is suddenly increased from a "zero" level to one of those three different levels. The points labeled A, B, C, and D designate specific events as follows: A is the point of the initial change in required torque; B is the point that the piston starts to move toward engagement; C is the point the piston stops moving and the pressure more closely matches the current signal; and D is the point that the control technique assumes that engagement is complete and varies current toward the required value.

Case 1 illustrates engagement to a very low level of torque. In this case, the current between points A and D1 is set beyond the required level of torque to reduce engagement delay. If this were not done, engagement to very low levels of torque could have significant delay time. The initial current level is selected for the best compromise between response and smoothness for engagement to low levels of torque. The duration is selected to ensure engagement C1 is complete before changing the control signal at D1.

Case 2 illustrates engagement to a moderate level of torque. In this case, between points A and D2, the current corresponds to lower torque than the required value to achieve smooth engagement, but it is higher torque than in Case 1 for faster response, assuming that more initial torque is acceptable. The deviation of initial current from Case 1 is roughly proportional to the required torque, again for the best compromise of smoothness and response. Although the initial current is shown starting at the same value as in Case 1 and ramping down, it could alternately step down to a lower constant value.

Case 3 illustrates a possible control variation for maximum response when very high torque is required. A smooth torque limit can be defined, below which engagement is controlled as described above, and above which there is no control delay for engagement. The current steps to an initial value and ramps toward the required value with the engagement completing at some point C3 during the ramp. The ramp rate can be selected to give some degree of smoothness. This control variation is useful on brakes and track type vehicle steering to give very smooth control over most of lever or pedal range without compromising the response if the lever or pedal is moved to the extreme.

FIGS. 4–7 are flow charts illustrating control logic for the preferred embodiment of the present invention, specifically a spring applied, hydraulically released clutch or brake. Referring to FIG. 4, the control logic starts at 100. Internal variables are set to the preferred initial state for the application at 102. The required torque level is computed at 104. The control status is computed at 106 and is described in further detail in FIG. 5. The torque is computed at 108 and is described in further detail in FIG. 6. Note that in this description of the control logic, the term torque refers to an internal control parameter that is roughly proportional to the resulting steady state torque of the clutch or brake 19 (FIG. 1). There is a defined relationship between this torque parameter and the control current and it is convenient to use this torque parameter to define the control current, even when the clutch or brake is not engaged. The current is computed at 110 based on the torque parameter and is described in greater detail in FIG. 7. The foregoing computations are repeated at fixed time intervals, therefore there is a delay and loop 112 back to 104.

FIG. 5 is a flow chart illustrating control logic to compute the status of the clutch or brake. Two status parameters are computed based on the required torque and the previous status: 1) a logic parameter indicating either released/releasing or engaging/engaged; and 2) an engagement counter indicating the number of loops from the start of engagement. The engagement counter is also used to hold a minimum engagement time. A minimum engagement time avoids engagement delays, potential harshness, and disengagement flow demand during a rapid sequence of required torque pulses. Beginning at 202, a determination is made whether or not the clutch or brake is released. If the clutch or brake is released, the required torque is tested at 204 and if the required torque is greater than zero, the status is changed to not released at 206 and the engagement counter is cleared to zero at 208. If at 202 the status is not released, then a determination is made whether the engagement counter is less than the minimum engagement time at 210. If the engagement counter is less than the minimum engagement time, the counter is incremented at 212. If the engagement counter is greater than the minimum engagement time, then a determination is made whether the required torque is zero at 214. If the required torque equals zero, then the status is released at 216. If the required torque does not equal zero at 214, then the status is not released.

FIG. 6 is a flow chart illustrating the control logic used to compute the internal torque parameter based on the required torque and the status. The logic in FIG. 6 can be related to the three cases illustrated in FIG. 3. It should be noted that all three cases set the same initial value at 320 on loop 0 of the engagement counter as follows. A determination is made whether the status is released at block 302. If the status has not been released, then the engagement counter is checked at block 304. If the engagement counter equals zero, then the torque is set equal to the initial drain torque at block 320.

In Case 1, the required torque is less than the initial drain torque. Therefore, when those values are compared at block 306, subsequent loops (e.g. engagement counter>0) will then pass through block 308, wherein a comparison is made between the engagement counter and the drain time. The torque will not be changed until the end of the drain time, when block 324 sets the torque equal to the required torque.

In Case 2, the required torque is greater than the initial drain torque but less than the smooth torque limit. The required torque and drain torque are compared at block 306. In this Case, since the required torque is greater than the initial drain torque, a comparison is made at block 310 between the required torque and the smooth torque limit. Since the required torque is less than the smooth torque limit in this Case, the engagement counter is compared to the drain time at block 312. If the drain time is less than the engagement counter, then the rate is set equal to the drain rate at block 316. Thereafter, the torque changes toward the required torque at the slow drain rate at block 322, until the end of the drain time when blocks 318 and 322 cause the torque to change toward the required torque at the smooth rate. It should be noted that the same equation in block 322 applies both during and after engagement, only the rate is different (e.g. smooth rate or drain rate from blocks 318 and 316, respectively). The drain rate is selected for the best compromise between initial torque and delay as required torque varies. The smooth rate is also selected for the best compromise between smoothness and response as torque is increased to the required torque.

In Case 3, the required torque exceeded both the initial drain torque and the smooth limit torque. The required torque and the initial drain torque are compared at block 306. In this Case, since the required torque is greater than both the initial drain torque and the smooth limit torque, a comparison is made at block 310 between the required torque and the smooth torque limit. Since the required torque is greater than the smooth torque limit in this Case, subsequent loops pass through block 314 wherein the rate is set to the fast rate and thereafter through block 322, causing the torque to change toward the required torque at the fast rate. The drain rate is not used in this case. The fast rate is selected for the best compromise of smoothness and response in this extreme case.

In all cases, after the initial drain time, when required torque decreases, block 324 will set torque equal to the required torque with no delay, but when required torque increases, block 322 will increase torque at either the smooth rate or the fast rate depending on whether the required torque exceeds the smooth limit.

It should be noted that the logic as described above has a fixed drain time parameter that is selected for the worst case. This is acceptable in many applications but it is not intended to limit the scope of the present invention to a fixed drain time. As noted above, the drain time varies as the drain pressure is changed. Knowledge of this fact may be used to adjust the drain time. Alternately, other feedback signals may also be used to detect the end of drain time and trigger the start of modulation.

FIG. 7 is a flow chart showing the control logic to compute the control current based on the internal torque parameter and the release status. A determination is made at block 402 whether the status is released. If the status is released, block 406 sets the current to the required level to release the clutch or brake. If status is not released, then the torque parameter is tested at block 404. If torque is at the maximum, then current is set to zero at block 410. If torque is less than maximum at block 404, then the current is computed at block 408 based on the torque. The equation contained in block 408 assumes a linear relationship between current and torque with means to calibrate "current at max torque" and "current at min torque".

FIG. 8 is a graphical representation illustrating one possible variation to the logic described in FIGS. 4–7. In the curves shown in FIG. 3 and the logic shown in the flowcharts of FIGS. 4–7, during engagement, the current stepped to an initial value and then changed toward the required torque during the drain time. FIG. 8 illustrates a fixed relationship between the internal torque parameter used during engagement and to the required torque. Thus, the current would step to a value dependent upon required torque and maintain that constant relationship to the required torque during the drain time. This variation offers a slight improvement over the previous logic while retaining its basic benefits. Between the points A and B, the engagement torque is higher than the required torque to reduce the engagement delay as previously illustrated in Case 1. Between points B and C, the engagement torque is less than the required torque for the best compromise between initial torque and response as illustrated with Case 2. Between points C and D, the initial torque is much higher for response in extreme cases and the torque can either ramp without waiting for engagement or can be held at this higher torque level until drained and the machine can respond to this torque level.

FIG. 9 is a block diagram of an alternate embodiment of the present invention illustrating control of a hydraulically applied clutch or brake. The system shown in FIG. 9 is similar to the system shown in FIG. 1 except that the hydraulic pressure in piston assembly 13 acts on piston 23 to apply the engagement force on clutch or brake 19. Therefore, with zero pressure there is minimal torque, and at high pressure there is high torque.

FIG. 10 is a graphical representation of the control technique of the alternate embodiment shown in FIG. 9. It should be noted that the torque curves, torque signals and the resulting torques are identical to those shown in FIG. 3, but the current curves and pressure curves are reversed from those shown in FIG. 3 since the hydraulic pressure in piston assembly 13 acts on piston 23 to apply the engagement force on clutch or brake 19. Therefore, with zero pressure there is minimal torque, and at high pressure there is high torque.

FIG. 11 illustrates the control apparatus 11 for a clutch and brake steering system in the form of a block diagram showing the application of the present invention to a vehicle 12 with left and right tracks 14,16. Driving force is applied to the tracks 14,16, through a respective pair of left and right clutch and brake systems 18,20 which are responsive to a source 22 of fluid pressure to steer the vehicle 12. The clutch and brake systems 18,20 are of conventional design in common use on track type tractors wherein each of the systems 18,20 includes a clutch 24,25 which is alternately engageable and disengageable to respectively connect and disconnect the driving force applied to the tracks 14,16 of the vehicle 12. The clutch 24,25 is hydraulically operated with pressure acting to engage the clutch. More specifically, in the preferred embodiment the clutch 24,25 is fully engaged and transferring power to the tracks 14,16 at 335 psi. At 0 psi, the clutch 24,25 is fully disengaged with no power being transferred to the tracks 14,16. At pressures intermediate these extremes, the clutch 24,25 "slips" by a percentage proportional to the control pressure and only a portion of the power is transferred to that track 14,16.

Similarly, the clutch and brake systems 18, 20 also include a brake 26,27 alternately actuatable and releasable to respectively brake and release the tracks 14,16 of the vehicle 12. Typically, the brake 26,27 is a hydraulically operated disc type with pressure acting to disengage the spring applied brake. For example, in the preferred embodiment, a brake pressure of 335 psi fully disengages the brake 26,27 while a reduced pressure of 0 psi fully engages the brake 26,27. Correspondingly, an intermediate pressure of 250 psi results in initial braking which is commonly referred to as "touch up".

The control apparatus 11 for the clutch and brake steering system includes a clutch valve means 28 for controlling the fluid pressure delivered to the clutches 24,25 in response to receiving an electrical control signal. The clutch valve means 28 includes separate, alternately actuatable electrohydraulic proportional valves 30,32 connected for modulated fluid communication between a fluid pressure source 22 and each of the clutches 24,25. The valves 30,32 are of conventional design and each includes an inductive coil 34,36 for controlling the position of a valve (not shown) to maintain the control pressure at a preselected value. The magnitude of the control pressure is variable in direct proportion to the magnitude of the electrical control signal.

Similarly, a brake valve means 38 controls the fluid pressure delivered to each of the brakes 26, 27 in response to receiving an electrical control signal. The brake valve means 38 includes separate, alternately actuatable electrohydraulic proportional valves 40,42 connected for modulated fluid communication between the fluid pressure source 22 and each of the brakes 26, 27. The valves 40,42 are of conventional design and each includes an inductive coil 44,46 for controlling the position of a valve (not shown) to maintain the control pressure at a preselected value. The magnitude of the control pressure is variable in direct proportion to the magnitude of the electrical control signal.

A required torque level may be determined from a manual input such as from a left steering lever 80A, a right steering lever 80B, a brake pedal 80C, or a parking brake switch 80D. Computer based control unit 62 receives the signals from all the sources 80A–80D, implements the control logic as described above, and provides control signals compatible with clutch and brake valves 30,32,40 and 42. When the operator has some means to vary the steady state clutch or brake torque, this signal can also be used to vary the engagement pressure. When the operator command changes from no torque to light torque, the pressure may be initially held at a level of light brake torque, for a sufficient time for engagement. This initial pressure pulse can correspond to higher torque than the steady state requirement to improve response. When the operator command changes from no torque to high torque, the pressure may be initially held at a pressure corresponding to higher initial torque than the previous case which required low steady state torque. Although the initial torque is higher in this case, it may be significantly lower than the steady state torque to maintain some degree of smoothness.

One method of implementation is with a step to an initial smooth engagement pressure which changes toward the steady state level such that the rate of change is proportional to the difference between the present value and the steady state target value. In this way, requests for higher steady state torque result in higher initial torque and faster response time. The starting value is set for a reasonable compromise between smoothness and response for light steady state torque. The initial pulse is constant if the steady state torque is less, and changes only if the steady state torque is greater. The same implementation is utilized after the initial engagement pulse, except that the rate parameter is higher to limit the rate of torque rise after engagement, again for smoothness.

Further, the rate parameter also depends on the steady state value (e.g. the value of the operator control signal). The rate parameter may also depend on the source of the signal (e.g. brake pedal versus steering lever). In this way, smoothness is maintained over most of the operating range with no compromise in response when an extreme is requested.

Alternately, the initial pressure may be a function only of the steady state level (e.g. operator control signal). This implementation offers a slight advantage in that the initial pressure will more quickly adjust to increases in the requested steady state torque and improve response.

Industrial Applicability

The present invention provides a spring applied hydraulically released clutch or brake, including a means for determining a required torque, a computer based controlling unit for carrying out the control technique of the present invention, an electrohydraulic valve, and a clutch or brake. In such a system, there is a delay applying the clutch or brake as hydraulic fluid flows from the piston that is controlling the degree of clutch or brake torque. At high pressures, the spring is compressed and there is no clutch or brake torque. When the pressure is very slightly less than balancing the spring force, there is slight brake torque and a comparatively long engagement time because there is very little pressure difference to cause flow. At lower pressure, the delay time is less but the torque is higher. Smooth engagement of a clutch or brake requires low initial torque, but quick response requires short delay times.

Therefore, the present invention pertains to applications of clutches and brakes in which the required engagement torque varies and there is not a constant drain pressure with acceptable response and smoothness for all conditions. Oftentimes, more delay is acceptable when engaging to a low torque and more initial torque is acceptable when engaging to a high torque. The response and smoothness can be improved by varying the drain pressure based on the required torque. The control logic momentarily sets the control signal to an initial level to allow adequate time to engage the clutch or brake, and then decreases the control signal at an acceptable rate until reaching the required torque level. Further, the initial level is varied based upon the required torque, such that at low levels of required torque, a signal with low initial torque (although possibly higher than the required torque), is used to achieve smoother engagement at some sacrifice in response, and at higher levels of required torque, a signal with higher initial torque is used to improve response.

Other aspects, objects, and advantages of this invention can be obtained from a study of the drawings, the disclosure, and the appended claims.

I claim:

1. An apparatus for controlling at least one of a clutch and a brake in an application with variable torque requirements, comprising:

means for determining a required torque level and responsively producing a required torque signal;

control means for receiving the required torque signal, examining predetermined transients, and responsively producing a control signal;

at least one of a clutch assembly and a brake assembly, said at least one of a clutch assembly and a brake assembly comprising a piston assembly, said piston assembly adapted to control the amount of clutch or brake torque; and an electrohydraulic valve, said electrohydraulic valve receiving said control signal and regulating control pressure to said at least one of a clutch assembly and a brake assembly;

said piston assembly reaching a touch up state after a predetermined dwell time, whereby drain pressure of said piston assembly is varied based upon the required torque level.

2. An apparatus as recited in claim 1, wherein said piston assembly includes a spring adapted to apply a spring force to engage the brake or the clutch, said spring force being opposed by the control pressure.

3. A method for controlling a clutch or a brake in an application with variable torque requirements, comprising the steps of:

determining a required torque level and responsively producing a required torque signal;

examining transients while the clutch or the brake is being engaged or disengaged and responsively producing transient control signals;

receiving said required torque signal and said transient control signals and responsively producing a valve control signal;

controlling actuation of an electrohydraulic valve in response to the valve control signal, said electrohydraulic valve regulating control pressure delivered to the clutch or the brake;

regulating dwell time, thereby allowing a piston assembly adapted to control the degree of clutch or brake torque to touch up; and varying drain pressure based upon the required torque level.

* * * * *